June 14, 1932. F. C. RUPPEL 1,862,769
RADIATOR FOR MOTOR VEHICLES
Filed Feb. 27, 1928 2 Sheets-Sheet 1
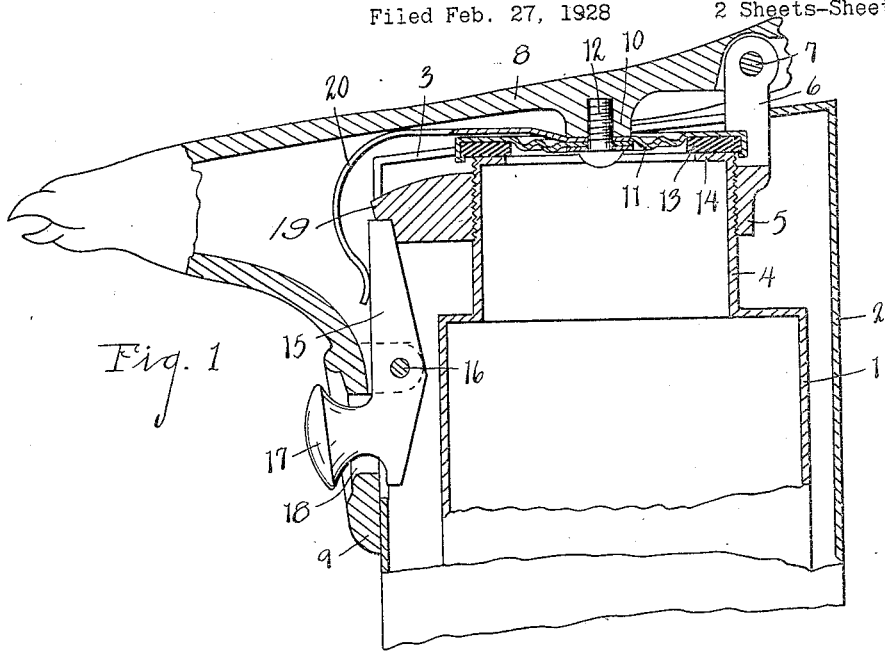
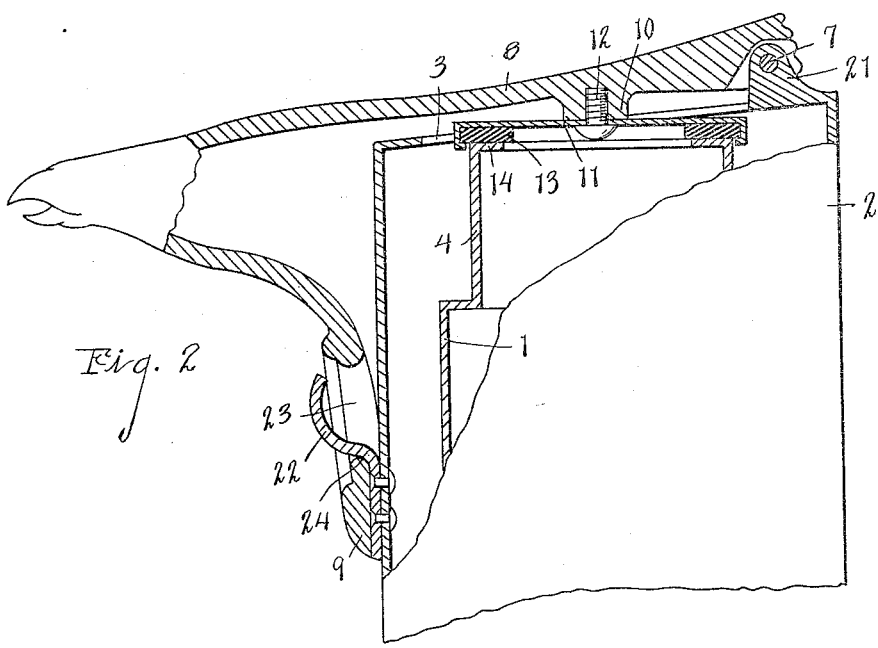
INVENTOR
Frederick C. Ruppel
BY Chappell & Earl
ATTORNEYS Patented June 14, 1932

1,862,769

UNITED STATES PATENT OFFICE

FREDERICK C. RUPPEL, OF GRAND RAPIDS, MICHIGAN, ASSIGNOR TO W. B. JARVIS COMPANY, OF GRAND RAPIDS, MICHIGAN

RADIATOR FOR MOTOR VEHICLES

Application filed February 27, 1928. Serial No. 257,436.

The main object of this invention is to provide an improved radiator for motor vehicles in which the filling opening of the radiator is concealed and at the same time is easily accessible.

A further object is to provide an improved radiator of the class described which is attractive in appearance and very easily operated or manipulated to open or close the radiator filling opening.

Objects pertaining to details and economies of my invention will definitely appear from the description to follow. The invention is described in the claims.

A structure embodying the features of my invention is clearly illustrated in the accompanying drawings, in which:

Fig. 1 is a fragmentary view of a structure embodying the features of my invention, mainly in vertical section.

Fig. 2 is a fragmentary view mainly in vertical section of a modified form or embodiment of my invention.

Figure 3:
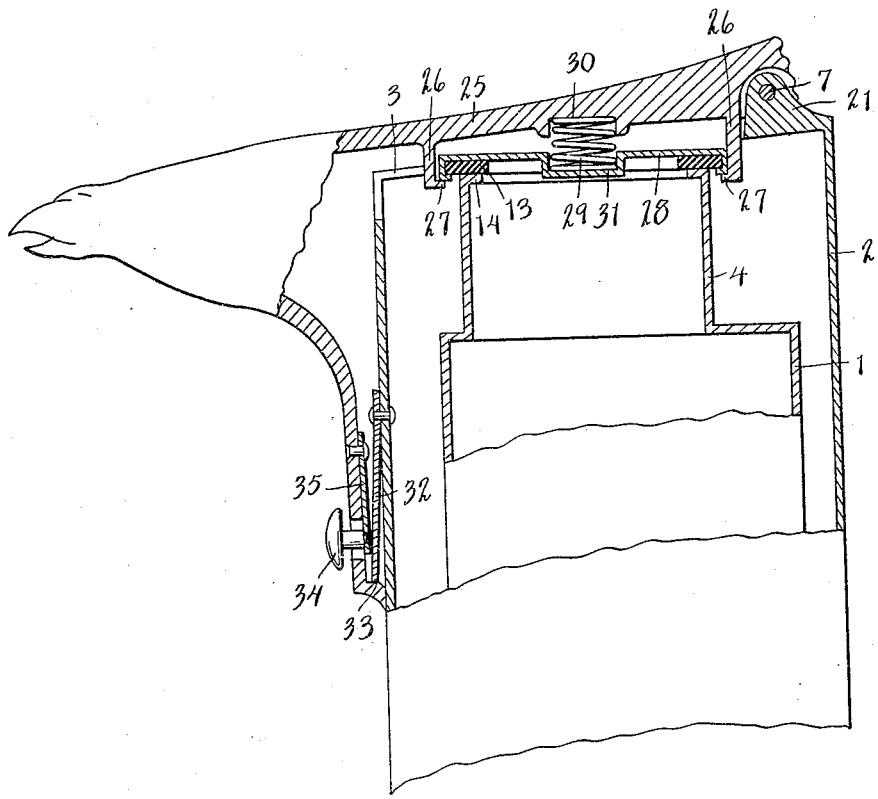
Fig. 3 is a fragmentary section of a further modification.

In the embodiment illustrated, 1 represents the radiator proper and 2 the shell. The shell is provided with an opening 3 alined with the filling neck 4 of the radiator.

In the embodiment shown in Fig. 1 a support 5 is threaded upon the neck. This support carries an upwardly projecting ear 6 for the pivot 7 of the closure member 8. This closure member is adapted to swing forwardly over the opening 3 in the radiator shell and has a depending or downwardly extending flange-like portion 9 overlapping the front of the shell.

The closure member 8 has a depending stud 10 to which the disk-like valve member 11 is secured by means of the screw 12. This valve member is of spring material and in the embodiment shown in Fig. 1 is annularly corrugated. The valve member is provided with a face 13 of rubber, fiber or other suitable material adapted to close against the valve seat 14 surrounding the opening of the neck 4. When the closure is in closed position this spring valve member is put under tension so that it yieldingly holds the facing against the valve seat.

A latch 15 is pivoted at 16 within the closure member and has a finger piece 17 extending through the opening 18 in the closure member. This latch coacts with a keeper 19 projecting forwardly from the support 5.

A spring 20 is clamped to the stud 10 by the screw 12 and carried forward to coact with the latch to hold it yieldingly in engagement with the keeper and urge it to engaging position when the closure is closed.

In the embodiment shown in Fig. 2 the closure member 8 is mounted on the pivot ear 21 on the shell and supported in the same relation as in Fig. 1. The spring valve member 11 in this embodiment is not corrugated and, while lacking some of the spring or resilience of the embodiment shown in Fig. 1, is very satisfactory.

In this embodiment a spring latch 22 is provided, the closure having an opening 23 there'n through which this latch projects when the closure is in closed position as shown in Fig. 2. The lower edge 24 of the opening acts as a latch engaging keeper.

The closure is drawn downwardly owing to the cam shape of the latch, thereby placing the valve under tension, the valve acting in both embodiments as a spring means preventing rattling of the parts should there be any looseness in the pivot.

In the embodiment shown in Fig. 3 the closure member 25 has downwardly projecting supports 26 terminating in in-turned lugs 27 providing a cage for the disk-like valve 28. A coiled spring 29 is arranged in a seat 30 on the closure and a seat 31 on the valve disk, thereby yieldingly supporting the valve.

In this embodiment a spring latch 32 is mounted on the radiator shell to engage the keeper 33 on the closure member. A push button 34 carried by the spring 35 is provided for releasing the spring latch, the push button forcing the spring latch inwardly until it clears the keeper, permitting the closure to be swung open.

My improvements avoid the necessity of great care and accuracy in forming and assembling the radiator within the shell and the opening in the shell may be of such size as to permit considerable variation. At the same time the filling opening is effectively closed.

My improved closure lends itself to various embodiments or adaptations and to a variety of ornamental changes, there being no projecting caps or the like as is now common practice. I have not attempted to illustrate various modifications and adaptations which I contemplate as I believe this disclosure will enable those skilled in the art to embody or adapt the same as may be desired.

Having thus described my invention what I claim as new and desire to secure by Letters Patent is:

1. The combination with a radiator shell having an opening therein, a radiator disposed within said shell and provided with a filling neck alined with said opening and having an upwardly facing valve seat, a closure member support mounted on said neck and having an upwardly projecting pivot ear at the rear thereof, a closure member pivoted on said ear and having a downwardly projecting stud on its under side and a downwardly projecting flange-like portion overlapping the front of the radiator shell when the closure is in closed position, a resilient disk-like valve member mounted on said stud and provided with an annular facing coacting with said valve seat, and a latch means for said closure member.

2. The combination with a radiator shell having an opening therein, a radiator disposed within said shell and provided with a filling neck alined with said opening, a closure member support mounted upon said neck, a closure member for said shell opening pivoted on said support, and a valve for said filling neck carried by said closure member.

3. The combination with a radiator shell having an opening therein, a radiator disposed within said shell and having a filling opening terminating within said opening in said shell, a closure member for said shell opening pivotally mounted on said radiator at the rear of said opening, said closure member having a downwardly projecting stud on its under side, a resilient disk-like valve member mounted on said stud and provided with a valve facing, and a latching means for retaining said closure member in closed position.

4. The combination with a radiator shell having an opening therein, a radiator having a filling opening terminating within said opening in said shell, a closure member for said shell opening pivotally mounted on said radiator at the rear of said opening to swing forwardly over the opening and having a flanged portion overlapping the front of the shell, a spring valve member for said filling opening mounted on the inner side of said closure member, and a retaining means for said closure member.

5. The combination with a radiator shell having an opening therein, a radiator having a filling opening terminating within said opening in said shell, a closure member for said shell opening pivotally mounted on said radiator at the rear of said opening to swing forwardly over the opening, a spring valve member for said filling opening mounted on the inner side of said closure member, and a retaining means for said closure member.

6. The combination with a radiator shell having an opening therein, a radiator having a filling opening accessible through said opening in said shell, a closure member for said shell opening hinged to said radiator, a spring valve member for said filling opening carried by said closure member, and a retaining means for said closure member.

7. The combination with a radiator shell having an opening therein, and a radiator provided with a filling neck terminating within said opening, of a radiator cap for said shell opening pivoted to said neck, and a closure for said neck carried by said cap.

In witness whereof I have hereunto set my hand.

FREDERICK C. RUPPEL.